Patented Sept. 29, 1931

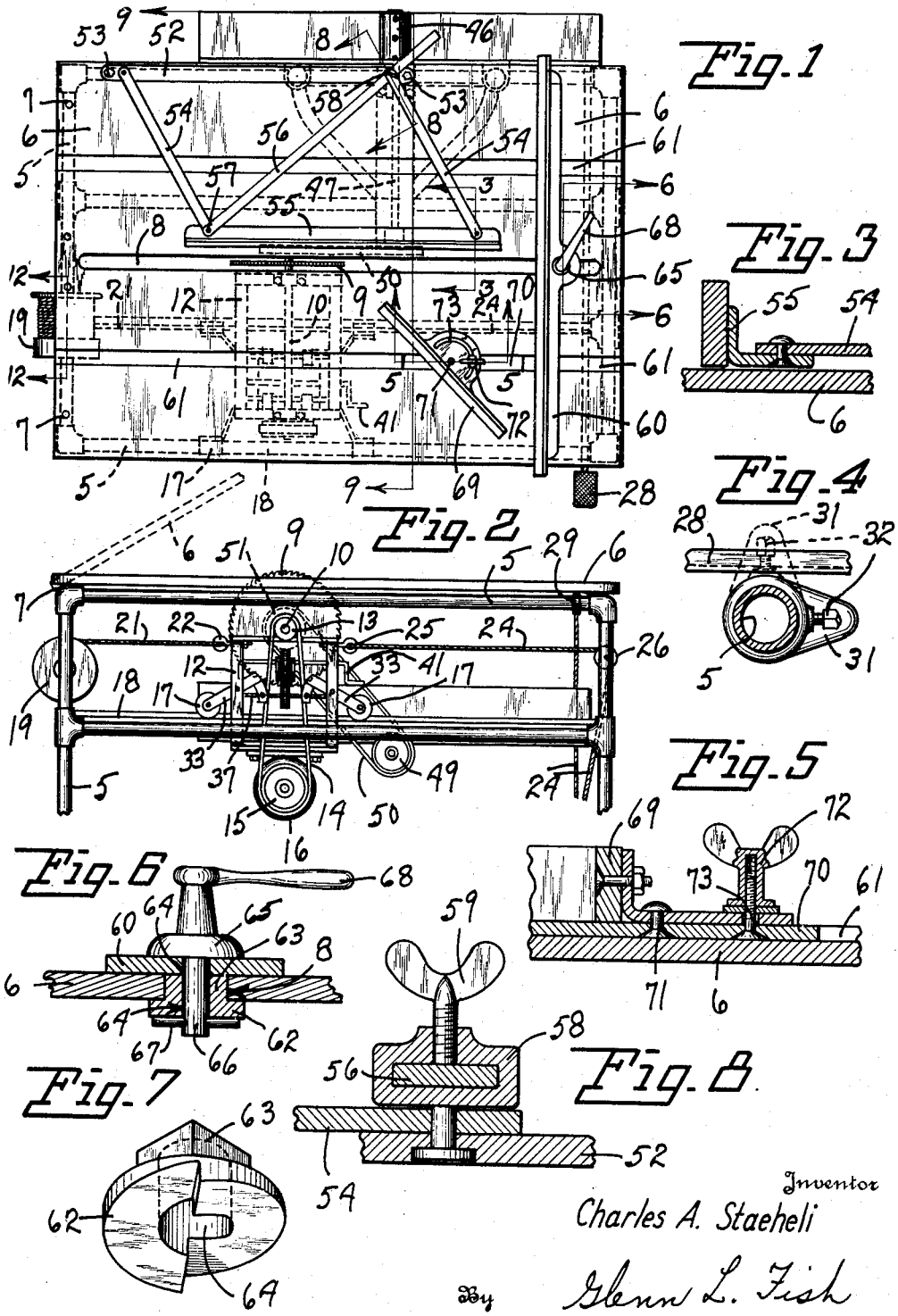

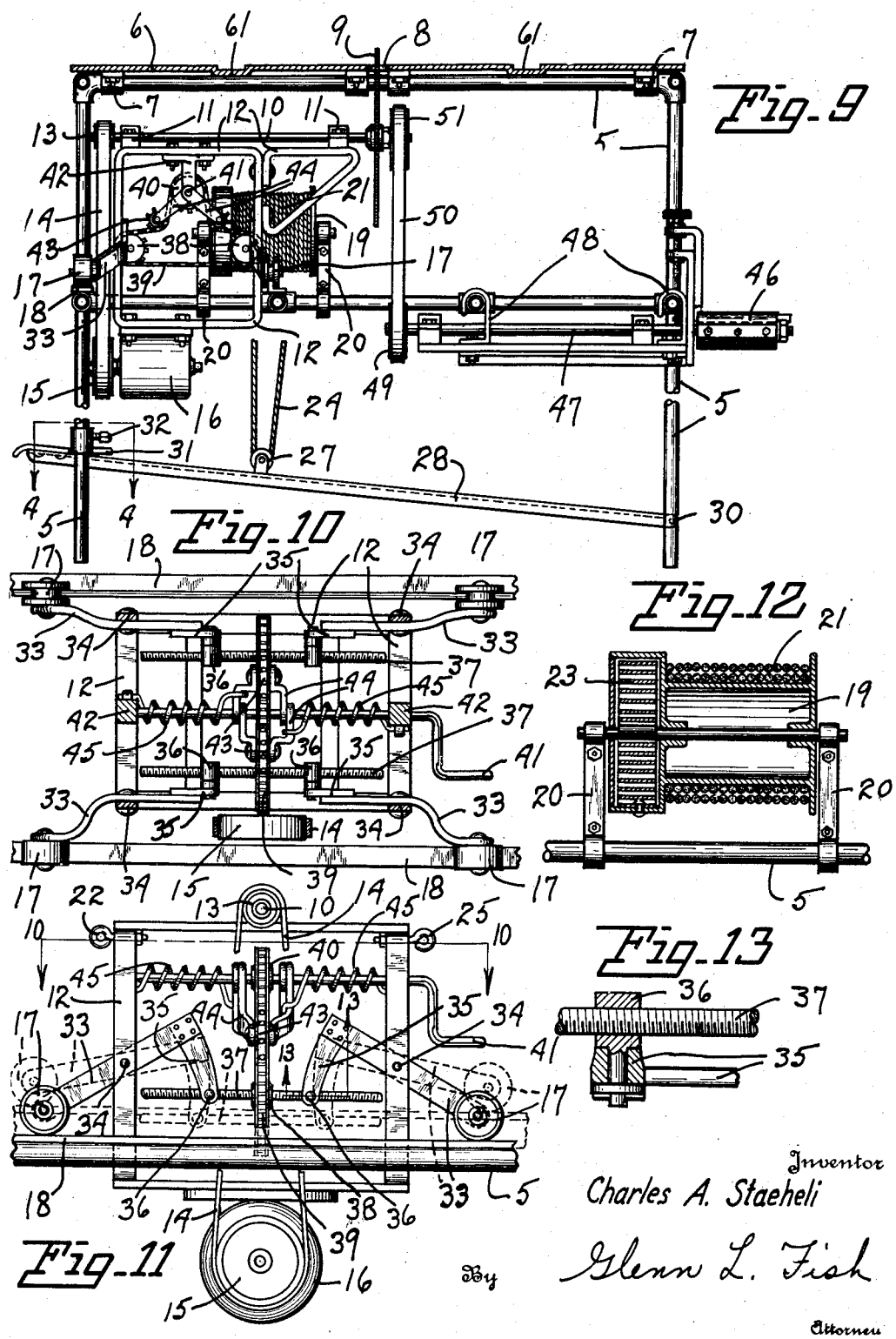

1,825,104

UNITED STATES PATENT OFFICE

CHARLES A. STAEHELI, OF SPOKANE, WASHINGTON

SAW TABLE

Application filed August 8, 1930. Serial No. 473,793.

My invention relates to saw tables and certain objects of the invention are to provide a saw table having a saw carriage with novel means for causing said carriage to travel back and forth. Further objects of the invention are to provide means for adjustably raising and lowering the saw carriage. Still further objects are to provide novel gauge and guide members for the table top in cooperative disposition with the saw and carriage.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1 is a top plan view of my saw table;

Fig. 2 is a view in side elevation of the same;

Fig. 3 is a detail view in vertical section taken on a broken line 3, 3 of Fig. 1 and showing the pivotal connection of the link arms with the longitudinally disposed guide gauge;

Fig. 4 is a detail view in horizontal section taken on a broken line 4, 4 of Fig. 9 and showing the pedal stop or lock for the saw carriage pedal;

Fig. 5 is a detail view in vertical section taken on a broken line 5, 5 of Fig. 1 and showing the securing means for the bevel gauge or guide;

Fig. 6 is a detail view in vertical section taken on a broken line 6, 6 of Fig. 1 and showing the securing means for the main guide or transversely disposed gauge;

Fig. 7 is a detail view in perspective of the locking cam for the main gauge;

Fig. 8 is a detail view in vertical section taken on a broken line 8, 8 of Fig. 1 and showing the locking means for the longitudinally disposed gauge;

Fig. 9 is a general view in transverse vertical section of the device taken substantially on a broken line 9, 9 of Fig. 1;

Fig. 10 is a detail view in horizontal section taken on a broken line 10, 10 of Fig. 11 and showing the saw carriage in top plan;

Fig. 11 is a view in side elevation of the saw carriage;

Fig. 12 is a detail view in vertical section taken on a broken line 12, 12 of Fig. 1 and showing the spring reel or drum used for returning the saw carriage to its normal position; and Fig. 13 is a detail view in horizontal section taken on a broken line 13, 13 of Fig. 11 and showing the screw and arm connection for raising and lowering the saw carriage.

Referring to the drawings throughout which like reference numerals designate like parts, the numeral 5 indicates the main frame of the saw table as a whole which is preferably constructed of iron pipe and which is provided with a sheet metal top 6 which is hingedly connected to said frame at 7. Said table top is centrally provided with a longitudinal slot 8 extending nearly the full length thereof. A circular saw 9 is mounted to project upwardly through said slot above the table top and is provided with means whereby it may travel back and forth within said slot and also with means whereby it may be raised and lowered with respect to the table top as hereinafter set forth.

The circular saw 9 is mounted on one end of a shaft 10 disposed transversely of the device and journaled in bearings 11 that are secured to the top of a carriage frame designated as a whole by the numeral 12. The outer end of said shaft is provided with a pulley 13 from which a belt 14 extends to another pulley 15 on the shaft of a motor 16 that is secured to the underside of said carriage frame as most clearly shown in Fig. 9 of the drawings.

The carriage frame 12 is provided with four wheels as designated by the numeral 17 that are adapted to travel on a track 18 secured longitudinally to the table frame 5. The means for causing said carriage to travel back to its normal position comprises a drum or reel 19 whose axle is journaled in brackets 20 secured to a member of the table frame as shown in detail in Fig. 12 of the drawings. A cable 21 is wound upon said drum with its other end connected to an eye-bolt 22 secured to the carriage frame and a coiled spring 23 mounted within the drum is tensioned to retain the carriage normally in the retracted position as will be understood.

The means for causing the carriage 12 to move forward comprises a cable 24 having one of its ends connected to an eye-bolt 25 secured to the forward end of said carriage frame. Said cable extends horizontally to a shive 26 mounted on the forward part of the table frame and thence downwardly to a shive 27 that is connected to a transversely disposed foot lever 28 and thence upwardly to a connection with said table frame at 29. Said foot lever is pivoted at 30 to the table frame and locking means may be provided for the foot engaging end portion of said lever comprising a stop member 31 pivotally mounted on an upright of the table frame and provided with a screw 32 whereby said stop member may be locked in the path of said lever to prevent its movement as shown in dotted lines in Fig. 4.

The means for raising and lowering the carriage 12 comprises an arm 33 for each of its wheels 17 pivoted at 34 to each of the four corner upright members of said carriage. The inner ends of said arms are provided with offset depending heads 35 whose lower ends are pivotally connected to block members 36 as shown in detail in Fig. 13. A worm or screw bar 37 extends threadedly through each aligned pair of said block members at either side of the carriage and each of said screw bars is centrally provided with a sprocket 38. A chain 39 extends around said sprockets and upwardly around a sprocket 40 keyed to a crank bar 41 that is mounted in bearings 42 secured to the carriage frame. Said chain may be depressed against said sprockets by a pair of idler sprockets 43 mounted on brackets 44 and held in place by springs 45 on said crank bar. By turning the handle end of said crank bar the chain will revolve the sprockets and worm bars to pivotally raise or lower the arms 33 and thus raise or lower the carriage as most clearly shown in Fig. 11.

A jointer or planer 46 may have its shaft 47 suspended by hook bracket bearings 48 from a member of the table frame 5 and a pulley 49 on its inner end may be connected by a belt 50 with a pulley 51 on the inner end of the shaft 10 if desired. Said belt may be installed by lowering the carriage 12 and then by raising said carriage the belt may be tightened to operative position as shown in Fig. 2. It will now be apparent that I have provided means for manually raising and lowering the saw carriage and means for causing said carriage to travel back and forth. The circular saw 9 which is mounted on said carriage may therefore be caused to move back and forth in the table slot 8 and may be moved up and down in said slot to suit the working conditions.

In order to gauge or guide the work in sawing boards to different thicknesses and angles I have provided a plurality of guides or gauges for use on the top of the table which guides are detachable and may be used separately or in severalty as desired. The first of these gauges is in the form of a parallelogram and is longitudinally disposed to gauge the work in parallel with the path of the circular saw 9 in its movements. Said gauge comprises a fastening bar 52 which may be secured to the edge portion of the table top 6 by pins or bolts 53 through its ends and thus be disposed in parallel with the path of the saw. Said fastening bar has arms 54 of equal lengths pivotally connected to each of its ends and said arms are pivotally connected to the end portions of a face bar 55 as shown in detail in Fig. 3. An adjusting bar 56 is pivoted at 57 to said face bar and extends diagonally to the other corner of the parallelogram where it is slidably disposed through a housing 58 as shown in detail in Fig. 8. A clamp screw 59 is provided for said housing and adapted to engage said adjusting bar whereby same may be moved back and forth and clamped in position to retain the face bar in the desired position or distance from the saw as will be understood.

A transverse gauge 60 may be provided on its underside with square projections adapted to fit into spaced apart longitudinal grooves 61 whereby the gauge is retained at right angles to the path of the saw 9. Said gauge may be centrally provided with a cam member 62 having a square reduced projecting portion 63 that is adapted to fit upwardly and slidably into the central longitudinal slot 8 and against said gauge as shown in detail in Fig. 6. Said cam member is provided with a center hole 64 which also extends through the gauge member and a clamp member 65 is provided with a stem 66 that fits downwardly through said holes. The underside of the cam member is cam faced, as shown in Fig. 7, and a pin 67 inserted through the lower projecting end of said stem is arranged to engage said cam face. Thus when the handle 68 of the clamp member is turned said pin in engagement with said cam will draw the cam and clamp members together and lock the gauge member in any desired position transversely of the saw.

A third gauge, as shown in detail in Fig. 5 and as designated by the numeral 69, is provided for the table top 6. Said gauge is particularly adapted for bevel or angular work and may be riveted or otherwise secured to a base plate or strap 70 that is adapted to fit into one of the longitudinal grooves 61. Said gauge is pivotally connected to said base plate by means of a pin 71 and a clamp screw 72 passing through an arcuate slot 73 provides means whereby this gauge may be clamped in any desired pivotal position as will be understood.

Having thus described my invention, it being understood that minor changes may be resorted to in its construction and arrangement without departing from the scope and spirit of the invention, what I claim and desire to secure by Letters Patent of the United States is:—

1. A saw table having in combination a table frame, a table top hingedly connected to the frame and having a longitudinal slot, a saw carriage adapted for movement in parallel with the slot, a circular saw for the carriage projecting through the slot, a track and wheels for the carriage, arms for the wheels pivotally connected to the carriage frame, depending head portions for said arms, a screw bar pivotally and threadedly connecting each longitudinally aligned pair of heads, a sprocket for each screw bar, a crank bar, a sprocket for the crank bar, and a chain extending around said screw and crank bar sprockets whereby rotary movement of the crank bar will rotate the screw bars and pivotally move the wheel arms to raise or lower the carriage.

2. A vertical adjusting means comprising in combination a carriage frame, a track and wheels for the carriage, arms for the wheels pivotally connected at their centers to the carriage frame, depending head portions for said arms, block members pivotally connected to the lower ends of said heads, a screw bar threadedly connecting each longitudinally aligned pair of blocks, a sprocket wheel fixed to the centers of said screw bars, a crank bar disposed above and intermediately of said screw bars and having a handle on its exterior end, a sprocket wheel for the center of said crank, a chain extending around said screw and crank bar sprockets whereby rotary movement of the crank bar will rotate the screw bars and pivotally move the wheel arms to raise or lower the carriage, and idler sprocket and spring means for depressing said chain against said sprockets.

In testimony whereof I affix my signature.

CHARLES A. STAEHELI.